United States Patent
Miller et al.

(10) Patent No.: US 10,065,502 B2
(45) Date of Patent: Sep. 4, 2018

(54) ADAPTIVE VEHICLE INTERFACE SYSTEM

(71) Applicant: FORD GLOBAL TECHNOLOGIES, LLC, Dearborn, MI (US)

(72) Inventors: Kenneth James Miller, Canton, MI (US); Douglas Raymond Martin, Canton, MI (US); William Paul Perkins, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/686,290

(22) Filed: Apr. 14, 2015

(65) Prior Publication Data

US 2016/0303968 A1  Oct. 20, 2016

(51) Int. Cl.
*B60K 35/00* (2006.01)

(52) U.S. Cl.
CPC ...... *B60K 35/00* (2013.01); *B60K 2350/1092* (2013.01); *Y02T 10/84* (2013.01)

(58) Field of Classification Search
CPC .. B60K 35/00; B60K 2350/1092; Y02T 10/84
USPC .......................................................... 701/36
See application file for complete search history.

(56) References Cited

U.S. PATENT DOCUMENTS

| | | | |
|---|---|---|---|
| 5,006,829 A | 4/1991 | Miyamoto et al. | |
| 5,757,268 A | 5/1998 | Toffolo et al. | |
| 6,275,231 B1 | 8/2001 | Obradovich | |
| 6,411,895 B1 | 6/2002 | Lau et al. | |
| 7,233,861 B2 | 6/2007 | Van Buer et al. | |
| 7,551,994 B2 | 6/2009 | Odinak et al. | |
| 7,683,771 B1 | 3/2010 | Loeb | |
| 7,755,472 B2 | 7/2010 | Grossman | |
| 7,835,859 B2 | 11/2010 | Bill | |
| 7,925,429 B2 | 4/2011 | Geelen | |
| 8,024,112 B2 | 9/2011 | Krumm et al. | |
| 8,093,998 B2 | 1/2012 | Grossman | |
| 8,306,734 B2 | 11/2012 | Mathews | |
| 8,344,870 B2 | 1/2013 | Evans et al. | |
| 8,519,836 B2 | 8/2013 | Grossman | |
| 8,527,143 B2 | 9/2013 | Tan | |
| 8,532,921 B1 | 9/2013 | Rovik et al. | |
| 8,542,108 B1 | 9/2013 | Izdepski et al. | |

(Continued)

FOREIGN PATENT DOCUMENTS

| | | |
|---|---|---|
| CN | 103196457 A | 8/2013 |
| DE | 102006047611 A1 | 4/2008 |

(Continued)

OTHER PUBLICATIONS

European Search Report dated Oct. 8, 2015 for Related European case GB1505974.4; 4 pages.

(Continued)

*Primary Examiner* — Yazan A Soofi
(74) *Attorney, Agent, or Firm* — Frank MacKenzie; Brooks Kushman, P.C.

(57) ABSTRACT

A vehicle interface system may include an interface configured to present selectable features, and a controller programmed to generate a feature probability for each selectable feature based at least in part on at least one historical selection of each selectable feature at a time from vehicle key-on, and display certain of the selectable features based on the generated feature probabilities.

17 Claims, 4 Drawing Sheets

(56) References Cited

U.S. PATENT DOCUMENTS

| | | |
|---|---|---|
| 8,872,647 B2 | 10/2014 | Prasad et al. |
| 8,963,698 B2 | 2/2015 | Grossman |
| 9,372,607 B1 | 6/2016 | Penilla et al. |
| 9,513,698 B2 | 12/2016 | Grossman |
| 2004/0070627 A1 | 4/2004 | Shahine et al. |
| 2005/0125148 A1 | 6/2005 | Van Buer et al. |
| 2005/0149881 A1 | 7/2005 | Proulx et al. |
| 2005/0154505 A1 | 7/2005 | Nakamura et al. |
| 2006/0200286 A1 | 9/2006 | Kumagai et al. |
| 2007/0150174 A1 | 6/2007 | Seymour et al. |
| 2008/0027639 A1 | 1/2008 | Tryon |
| 2008/0042814 A1 | 2/2008 | Hurwitz et al. |
| 2009/0146846 A1* | 6/2009 | Grossman ............... B60R 25/04 340/988 |
| 2010/0127847 A1 | 5/2010 | Evans et al. |
| 2010/0186711 A1 | 7/2010 | Speers et al. |
| 2010/0253491 A1 | 10/2010 | Grossman |
| 2011/0082620 A1* | 4/2011 | Small ..................... B60K 35/00 701/31.4 |
| 2011/0106435 A1 | 5/2011 | Stanton |
| 2011/0306304 A1 | 12/2011 | Forutanpour et al. |
| 2012/0002515 A1 | 1/2012 | Muench et al. |
| 2012/0109451 A1 | 5/2012 | Tan |
| 2012/0235834 A1 | 9/2012 | Grossman |
| 2013/0014040 A1 | 1/2013 | Jagannathan et al. |
| 2013/0038437 A1* | 2/2013 | Talati ..................... B60K 35/00 340/438 |
| 2013/0069982 A1 | 3/2013 | Hall et al. |
| 2013/0145065 A1 | 6/2013 | Ricci |
| 2013/0152001 A1 | 6/2013 | Lovitt et al. |
| 2013/0158772 A1 | 6/2013 | Swenson et al. |
| 2013/0342332 A1 | 12/2013 | Grossman |
| 2014/0094989 A1 | 4/2014 | Dadu et al. |
| 2014/0303839 A1* | 10/2014 | Filev ..................... G06F 3/0481 701/36 |
| 2014/0304635 A1 | 10/2014 | Kristinsoon et al. |
| 2014/0375447 A1 | 12/2014 | Raghunathan et al. |
| 2015/0169044 A1 | 6/2015 | Grossman |
| 2015/0243168 A1 | 8/2015 | Roelle et al. |

FOREIGN PATENT DOCUMENTS

| | | |
|---|---|---|
| JP | 2011075392 A | 4/2011 |
| WO | 2014107513 A2 | 7/2014 |

OTHER PUBLICATIONS

Jung, H. G. et al., System Configuration of Intelligent Parking Assistant System, Transportation Research Board, National Academy of Sciences (2013). <http://trid.trb.org/view.aspx?id=847045>.

Jung, H.G. et al., System Configuration of Intelligent Parking Assistant System, Transportation Research Board, National Academy of Sciences (2013). <http://trid.trb.org/view.aspx?id=847045>.

* cited by examiner

Probability of Vehicle Feature Selection (in percentage)
| | | Vehicle Feature | | | | | |
|---|---|---|---|---|---|---|---|
| | | Cruise Control | Climate Control | Park Assist | Navigation | Audio Control | Seat/Lumbar Control |
| Time Since Key Start | 0 | 2.00% | 83.40% | 0.50% | 0.90% | 50.60% | 84.40% |
| | 0:10 | 2.90% | 79.30% | 0.60% | 30.20% | 59.00% | 86.40% |
| | 0:20 | 2.92% | 30.80% | 0.50% | 50.90% | 75.40% | 80.40% |
| | 1:00 | 3.10% | 20.40% | 0.90% | 45.90% | 60.40% | 52.10% |
| | 1:20 | 45.80% | 8.20% | 0.90% | 46.10% | 45.80% | 12.40% |
| | 5:00 | 50.20% | 5.60% | 1.60% | 10.80% | 32.10% | 2.50% |
| | 10:00 | 60.02% | 58.80% | 40.90% | 8.40% | 20.80% | 1.30% |
| | 20:00 | 60.80% | 80.60% | 50.10% | 7.60% | 20.40% | 0.90% |
| | 60:00:00 | 70.60% | 8.30% | 20.10% | 5.20% | 22.30% | 0.70% |
FIG. 3
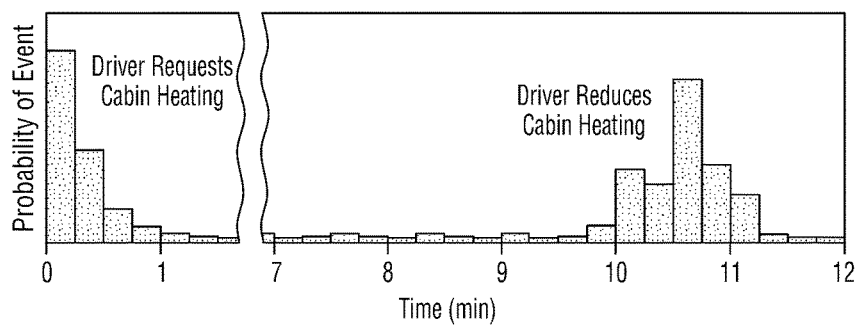
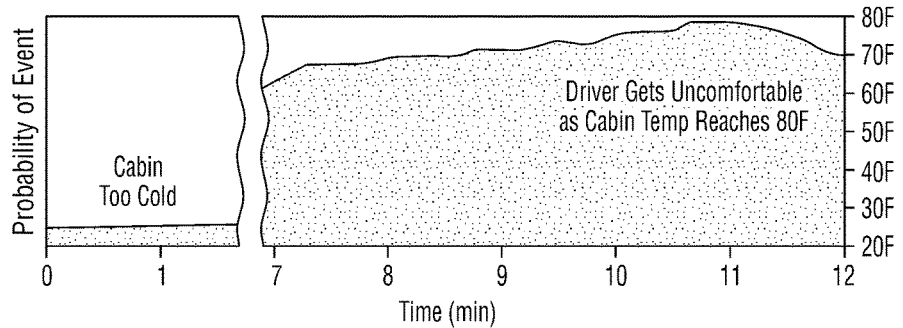
FIG. 4

ADAPTIVE VEHICLE INTERFACE SYSTEM

TECHNICAL FIELD

Disclosed herein is an adaptive vehicle interface system.

BACKGROUND

Vehicles often include many systems that allow a driver to interact with the vehicle and its systems. In particular, vehicles often provide a variety of devices and techniques to control and monitor the vehicle's various subsystems and functions. As the number of features and functions available to a driver increases, so does the complexity of the user interface used to control these features and functions. Thus, an enhanced and flexible system for presenting vehicle features to the user may be desired.

SUMMARY

A vehicle interface system may include an interface configured to present selectable features, and a controller programmed to generate a feature probability for each selectable feature based at least in part on at least one historical selection of each selectable feature at a time from vehicle key-on, and display certain of the selectable features based on the generated feature probabilities.

A vehicle interface system may include an interface configured to present selectable features, and a controller programmed to receive current vehicle attributes, compare current vehicle attributes to past vehicle attributes, generate a feature probability for each selectable feature based at least in part on a historical selection of one of the selectable features at similar past vehicle attributes, and display certain of the selectable features based on the generated feature probabilities.

A vehicle interface system may include an interface configured to present selectable features, and a controller programmed to generate a feature probability for each selectable feature based at least in part on a vehicle event and a historical selection of each selectable feature for a similar type event, and display certain of the selectable features based on the generated feature probabilities.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 3 illustrates an exemplary probability table for the interface system;

FIG. 4 illustrates graphical representations of a historical feature selection;

DETAILED DESCRIPTION

Figure 1:
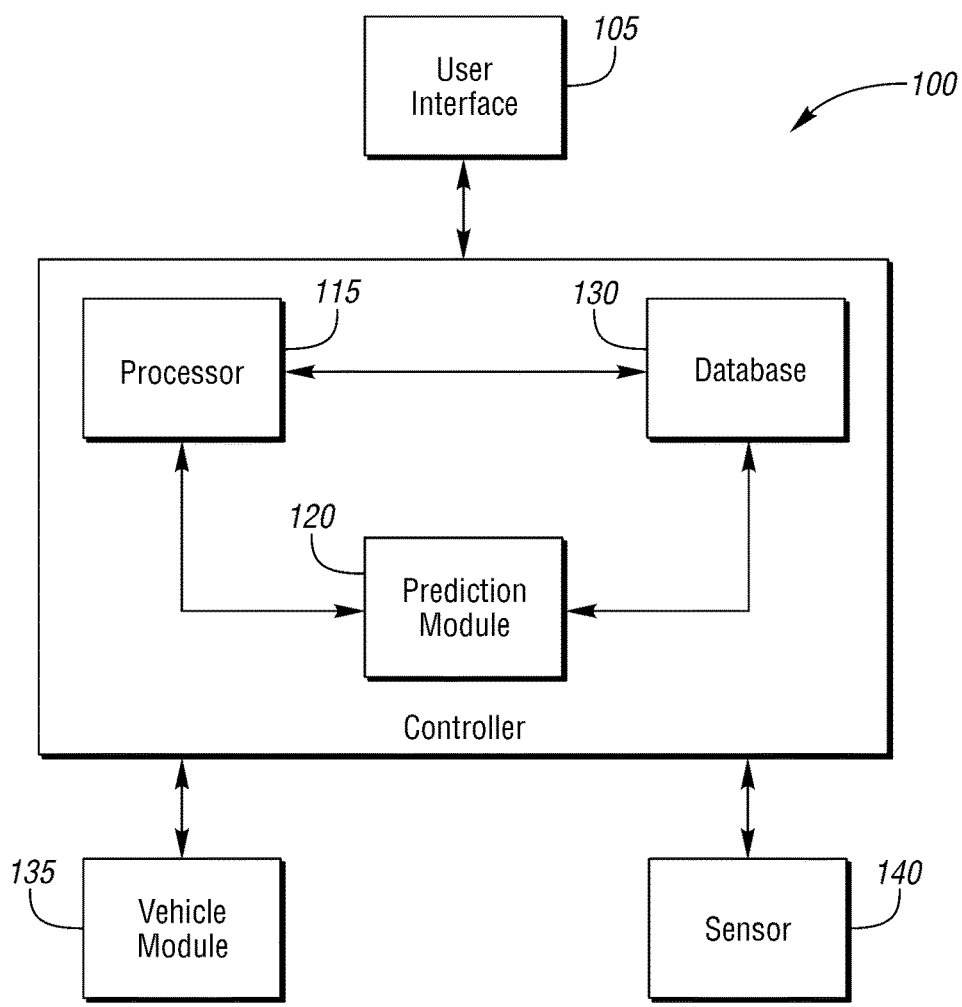
FIG. 1 illustrates exemplary components of the user interface system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle interface systems may provide various options for accessing and interacting with vehicle systems to the user these systems may include climate control systems, navigation systems, parking systems, etc. as the complexity of vehicle interface systems increase, for example with the increased options available with respect to electrical vehicles, such as state of charge vehicle range and other electrical vehicle buttons, customers may become overwhelmed by the options and information provided on the human-machine interface (HMI) within the vehicle. Each system may enable various vehicle features, such as cruise control, driving directions, parking assistance, etc. At certain times while the vehicle is in use, certain ones of these features may be more likely to be relevant to the current driving conditions than others. Additionally, certain ones of these features may be more likely to be selected by a specific driver at a certain time. For example, a first driver may often turn on a vehicle radio during his or her morning commute to work at approximately three minutes after the vehicle has been keyed-on. Based on past usage of this vehicle feature, a vehicle interface system may use historical selections to promote certain features to be displayed on a user interface within the vehicle. That is, certain icons or listings associated with the vehicle features may be displayed or hidden based on the likelihood that they would be selected by the user. Thus, highly relevant or probable features are likely to displayed, while features that are unlikely or impossible to use may not be displayed.

Specifically, each vehicle feature may be assigned a feature probability by a prediction module. The feature probability may be a numerical representation derived from comparing current vehicle conditions with past vehicle conditions. The prediction module may determine the probability that the feature will be selected based on past selections under similar vehicle conditions or situations. The feature probability may be used to rank the various vehicle features and to configure the interface to display those features with the highest probability. The feature probability may also be used to present an alert to the user via the user interface. Taking the example from above, if a vehicle radio is selected each weekday morning at approximately three minutes after the vehicle has been started, then there is a high probability that the feature will again be selected under similar circumstance (e.g., a Tuesday morning at approximately three minutes after key-start.) Thus, a selectable icon for the radio feature may be presented via the user interface at the similar circumstance.

Referring to the Figures, FIG. 1 illustrates a diagram of the user interface system 100. While the present embodiment may be used in an automobile, the user interface system 100 may be used in any vehicle including, but not limited to, motorbikes, boats, planes, helicopters, off-road vehicles, cargo trucks, etc. The system 100 may include a user interface device 105 (also referred to herein as an interface 105 and display 105). The user interface device 105 may include a single interface, for example a single touch screen, or multiple interfaces. The user interface system 100 may additionally include a single type interface or multiple interface types (e.g., audio and visual) configured for human-machine interaction. The interface device 105 may include a display such as a touchscreen and they also included display controlled by various hardware control elements. The interface device 105 may also include a heads up display (HUD) unit in which images are projected onto the windshield of the vehicle. The interface device 105 may be arranged within the dashboard of the vehicle so as to be visible and accessible to a driver of the vehicle. Additionally or alternatively, the interface device 105 may be arranged within a center console of a vehicle so as to be accessible to a driver and/or a passenger of the vehicle. The interface device 105 may also be included in a remote device, such as a user's mobile device, tablet, etc. The remote device (not shown) may be in communication with the vehicle or vehicle servers via a wireless communication. The wireless communication may be facilitated via an in-vehicle modem. Additionally or alternatively, other communication form may be implemented including hardwired communications.

The user interface device 105 may be configured to receive user inputs from the vehicle occupants. The user interface may include, for example control buttons and/or control buttons displayed on a touchscreen display (e.g., hard buttons and/or soft buttons) which enable the user to enter commands and information for use by the user interface system 100. Inputs provided the user interface device 105 may be passed to the controller 110 to control various aspects of the vehicle. For example, inputs provided to the user interface device 105 may be used by the controller 110 to monitor the climate of the vehicle, interact with a navigation system, controlled media playback, use park assist, or the like. The user interface device 105 may also include a microphone that enables the user to enter commands or other information vocally.

The controller 110 may include any computing device configured to execute computer-readable instructions that control the user interface device 105 as discussed herein. For example the controller 110 may include a processor 115, a prediction module 120, and a database 130. The database 130 may be comprised of a flash memory, RAM, EPROM, EEPROM, hard disk drive, or any other memory type or combination thereof. Alternatively, the prediction module 120 and the database 130 may be in incorporated into the processor 115. In yet another embodiment, there may be multiple control units in communication with one another, each containing a processor 115, prediction module 120, and database 130. The controller 110 may be integrated with, or separate from, the user interface device 105. The database 130 may maintain a list of selectable features and associated situation information associated there with. This is described in more detail below.

The controller 110 may be configured to control the availability of the feature on the user interface device 105 through the processor 115. The processor 115 may be configured to detect the user input indicating the user's desire to activate a vehicle system or subsystem by detecting the selection of a selectable feature on the user interface device 105. A selectable feature is created for each feature available in the vehicle (e.g., Temperature control, heated seats, parking assists, cruise control, etc.). Each selectable feature may control a vehicle system or subsystem. For example, the selectable feature for cruise control will control the vehicle system monitoring the vehicle's constant speed (or cruise control). Further, each selectable feature may control more than one vehicle system. The selectable feature may include an icon for being displayed on the interface 105. It may also include a textual description of the vehicle feature that their respective option controls, among other visual representations.

The controller 110, via the processor 115 may be configured to determine the features most likely to be of use to the driver or passenger, and eliminate, or de-emphasize, the features that have minimal or no use to the driver/passenger, giving the current driving situation. In order to determine the feature that may have the most relevance at the moment, the controller 110 may receive various inputs including contextual variables communicated by the vehicle module 135 and the vehicle sensor 140.

The vehicle module 135 may be a module in communication with other vehicle modules or systems such as the body control unit (BCU), the electronic control unit (ECU), etc. Additionally or alternatively the vehicle module 135 may be in communication with external systems. The sensor 140 may include any sensor or sensor systems available in or on the vehicle. For example, the sensor 140 may be an audio sensor, light sensor, accelerometer, velocity sensor, temperature sensor, navigation sensor (such as a Global Positioning System (GPS) sensor), moisture sensor, etc. While sensor 140 is depicted as a single sensor in FIG. 1, it is to be understood that sensor 140 may include a plurality of sensors including but not limited to at least one of the above listed sensors.

The vehicle module 135 and/or the sensor 140 may be configured to provide certain vehicle data to the controller 110, such as the current vehicle state (e.g. keyed on, keyed off, idle, etc.), cabin temperature, ambient temperature, GPS location, distance to known location, time of day, vehicle speed, smartphone usage, state of charge, other location data such as past endpoints or favorite locations, etc. This information may be stored in database 130, as described in more detail herein.

The prediction module 120 may be configured to determine a feature probability associated with each selectable feature. The prediction module 120 may interface with the database 130, as well as the processor 115, vehicle module 135, and sensor 140. The prediction module 120 may use data regarding past selectable features from the database 130, as well as vehicle data regarding current vehicle conditions from the vehicle module 135 and/or sensor 140. That is, the prediction module 120 may align current vehicle data with that past data as indicated by the vehicle attributes catalogued within the database 130. The prediction module 120 may align various current attributes with past attributes that are cataloged in database 130 to determine if a certain feature has been historically selected under similar vehicle conditions. For example, the prediction module 120 determines which features have historically been selected based on a time from vehicle key-on, or vehicle start. Some features may be routinely selected close to the vehicle start such as climate control, navigation systems, etc. Other systems may be selected after a certain time has passed since the key-on (e.g., 10 minutes) such as the radio, hands-free communications (e.g., Bluetooth connections with mobile phone), cruise control, etc.

Figure 2:
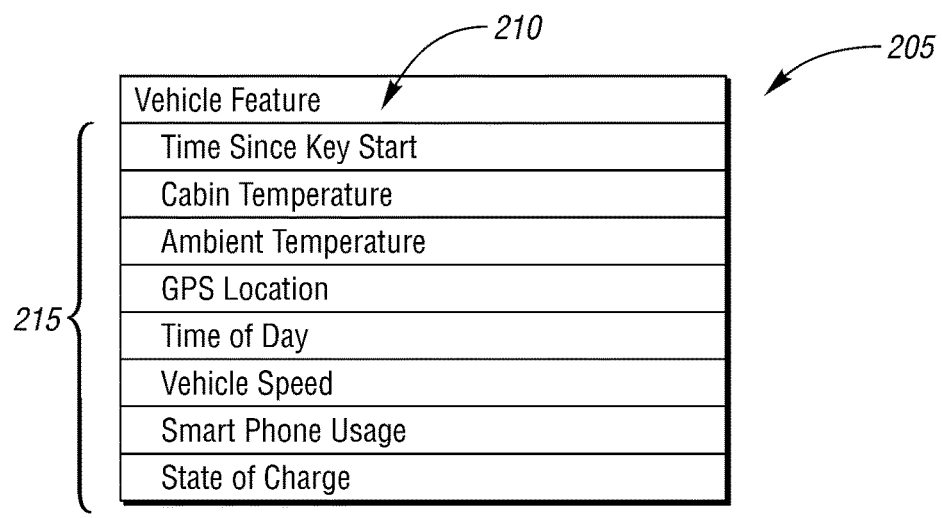
FIG. 2 illustrates an exemplary data entry for the interface system.

FIG. 2 illustrates an exemplary database entry 205 for a specific vehicle feature. The controller 110, via the processor 115, may store or catalog each instance that a vehicle feature is selected by the user. Each entry 205 may include at least one vehicle attribute. The vehicle attributes 215 may indicate situational information about vehicle at the time that the vehicle feature 210 was selected. For example, if a user selects an audio feature (e.g., a vehicle radio), the controller 110 may gather data from the vehicle module 135 and/or sensor 140 at the time the user selects this feature. This data may reflect certain characteristics about the current vehicle situation. As shown in FIG. 2, the vehicle attributes 215 may include but are not limited to a vehicle event (e.g., time since key start), cabin temperature, ambient temperature, GPS location, time of day, vehicle speed, smartphone usage, state of charge, etc. Each of these attributes 215 may be used to generate a feature probability as described in greater detail with respect to FIG. 5.

FIG. 3 illustrates an exemplary probability table showing various vehicle features and the probability that a specific user would select the feature at a time after a vehicle event. By way of an example only, the vehicle event, as shown in FIGS. 2 and 3, includes a key start. Other vehicle events may also be taken into consideration and may also include, vehicle braking during cruise control, enablement of climate control, door unlocked, door open, climate events (e.g., cabin temperatures reaching a predefined temperature), speed events (e.g., reaching a predefined speed), mobile device events (e.g., receiving a phone call), etc. Vehicle events may also include learned historical events. For example, if a user historically starts his car at 7:30 AM each weekday morning, this routine may become a learned event that may trigger certain alerts and promotes on the interface 105 (including the mobile device). The probability determinations made by the prediction module 120 and, as explained, may be based at least in part on past feature selections by a specific user. Although not shown in FIG. 2 or 3, other characteristics and attributes about a user's usage and feature selection may also be included in determining the probability that a certain feature is to be selected. These additional characteristics/attributes may include time of day, time of year (e.g., winter, summer, etc.), day of the week (including day characterization such as weekends or weekdays), weather, etc.

As shown in FIG. 3, different features are more likely to be selected at certain times than others. As shown, 10 minutes after the vehicle has been keyed on, the cruise control feature is more than 50% likely to be selected. Contrarily, the navigation system is less than 20% likely to be selected. These probabilities may then be used to determine which features will be displayed on the user interface 105. In one example, as a user begins his or her drive, the interface 105 may display features such as climate control, audio controls and seat/lumbar controls. However, as the drive continues, the interface 105 may be configured to display features such as cruise control, climate control and park assist. Thus the features with the highest probability are displayed via the interface 105.

FIG. 4 illustrates a graphical representation of an exemplary feature selection showing the probability of selecting the climate control feature across time. FIG. 4 also illustrates a graphical representation of historical cabin temperature increases across time. As shown in FIG. 4, the probability of a user selecting the climate control feature is high at the beginning of a trip because in the past, the user has historically selected such feature at the beginning of a trip. In the example shown in FIG. 4, the cabin is cold and therefore user may turn on or adjust the heat of the vehicle. As time goes on, the vehicle cabin gradually warms up. Once the cabin temperature reaches an uncomfortable temperature, the user is likely to decrease the heat of the cabin. Thus, the probability that the user selects the climate control feature on the interface 105, maybe based at least in part on a time from vehicle key start. In the example of FIG. 4, the highest probability of climate control feature selection may be within the first minute after key start and between minutes 10 and 11 after key start. Although time-since-start is used as the determining factors in the examples herein, other determining factors (e.g., vehicle events) could also be used, including an accumulated cabin heat energy vs. ambient temperature, etc.

Figure 5:
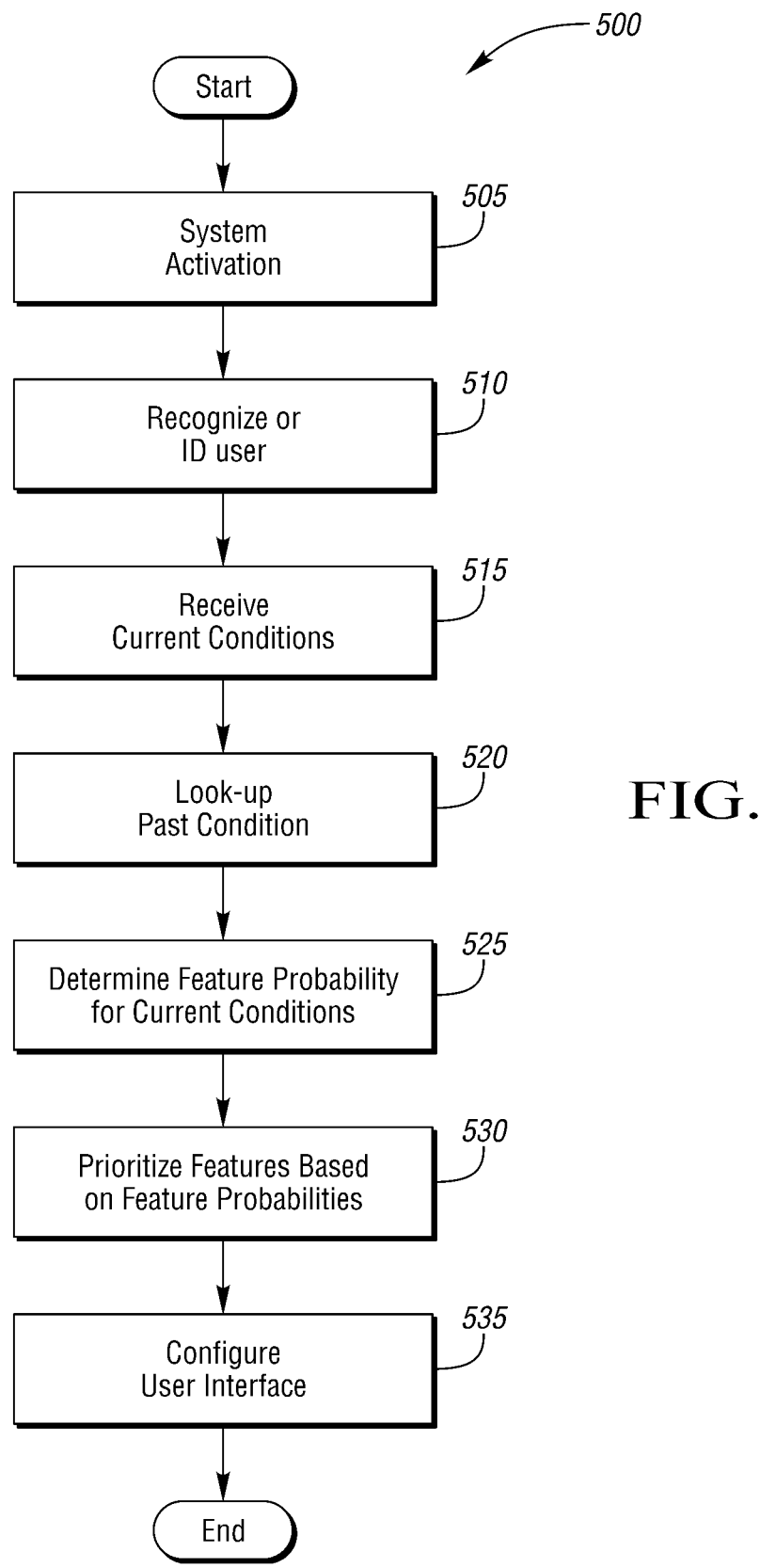
FIG. 5 illustrates a flow chart of an exemplary process of the user interface system.

FIG. 5 illustrates a flow chart for implementing an exemplary interface system process 500. The process 500 may begin at block 505 where the operation of the user interface system 100 may be activated automatically no later than when the vehicles in the extension is started (e.g., upon key-start).

At block 510, the controller 110 may recognize or identify the user. The user may be identified by several mechanisms. In one example the user may be identified by the vehicle key used to access and start the vehicle. This identification may be achieved via a wireless identification exchange such as radio frequency identification (RFID) technology, near field communications (NFC), etc. In another example, the use may be identified via some form of biometric data such as fingerprints, voice recognition, etc. In other examples, the user may be identified by a certain inputted credentials such as specific keys, passwords, etc.

At block 515, the controller 110 may receive or recognize the current vehicle conditions/attributes. This may include, for example, the attributes described above with respect to FIG. 2 such as a vehicle event, cabin temperature, ambient temperature, location, time of day, vehicle speed, smartphone usage, state of charge, etc. As explained, this information may be gathered from the vehicle module 135 and/or the sensor 140.

At block 520, the controller 110 may look up past conditions similar to those of the current conditions as identified in block 515. The past conditions, as explained, may be maintained and stored in the database 130.

At block 525, the controller 110, via the prediction module 120, may determine a feature probability based on the recognized current conditions and past feature selection during similar past conditions. That is, the prediction module 120 may determine a probability for each vehicle feature based on previous selections of that feature, or lack thereof, under similar situations. For example, if the user has historically turned on the vehicle radio each day on his way to work at approximately two minutes after the vehicle key-on, then if the current conditions are similar (i.e., it is a weekday and the vehicle was started approximately two minutes ago), then the prediction module 120 may determine that there is a high probability that the user will again turn on the vehicle radio. On the contrary, if the specific user does not turn on the vehicle radio during his morning commute but instead syncs his cell phone with the vehicle modem to make phone calls, then there is a low probability that the user will turn on the vehicle radio in this situation. Thus, greater consistency and repeatability of a feature for an event will increase the probability factor for a specific selection. Also, a higher number of occurrences of the selection, in general, will increase the probability factor.

As explained, the prediction module 120 may do similar analyses for each selectable vehicle feature and for each vehicle attribute. The feature probability may be generated by aggregating likelihood of feature selection based by taking the product, average, maximum, minimum, or other nonlinear algorithms such as or neural networks, for example. The feature probability may be directly proportional to the relevance of the aggregation of the historical selection of the feature with similar vehicle attributes. Different weights may be given to the vehicle attributes when determining the relevancy/probability of a certain event. For example, if a current vehicle event (e.g., time since key-on) is similar to a past vehicle event, this alignment may be given preference and therefore more weight in determining the feature probability. In some situations, vehicle events may be a sole factor in determining feature probability. The process may then proceed to block 530.

At block 530, the controller 110 may prioritize each of the selectable vehicle features based on the feature probability associated to the selectable feature in block 525. Generally, the selectable features with the highest feature probability may have the highest priority, and the rest of the available features may be ranked accordingly there on.

At block 535, depending on the user preference, either the features with the highest probability, or multiple features (e.g., the three features with the highest feature scores), may be promoted to the user interface device 105 for display and performance. Likewise, the features displayed on the user interface device 105 may be simultaneously eliminated (or demoted) if there were probability within the particular driving context has decreased. Additionally or alternatively, the processor 115 or controller 110 may order, or rank, the selectable features according to the feature probability associated with each feature. The controller 110 may then determine the order of the selectable features with the feature probability above a predetermined threshold. For example, the controller may only select the selectable features with a feature probability at or above 70%. The controller may rank the available features with the highest feature probability to a first position, another selectable feature with a slightly lower feature probability to a second position in the order, and so on.

In another example of promoting selectable features, the feature with the highest probability may be displayed via an alert, similar to that shown in FIG. 6 and described below with respect to the same. A selectable feature may be presented via an alert in response to the selectable feature having a high probability that the user will select this specific feature at this time. The prediction module 130, or controller 120, may make this determination by comparing the feature probability to a predefined threshold. For example, the threshold may be a high probability such as 80%. The prediction module 130 may also determine to display an alert when one feature has a significantly higher probability over other features. That is, for example, when the highest feature probability differs from the next highest feature probability by approximately 30%.

In one example, the climate control feature may be promoted and displayed on the interface device 105 upon key start. This may be based in part on historical selections of the climate control after key start for that specific user. However, after three minutes from key start, the cruise control feature may be promoted and displayed on the interface device 105. As explained, these features may be displayed either as part of a list of most relevant features, or as an alert for a single feature. Other features may also be promoted such as audiovisual controls, navigational features, etc. If the climate control feature has a lower probability than most other features, then the climate control feature may no longer be displayed on the interface device 105.

In another example, the vehicle event may include a climate event such as the cabin reaching a predetermined temperature that may be considered to be warmer than expected based on average customer preferences, or even user specific preferences. In response to this event, the climate control features may be promoted on the interface 105. While the climate control feature is discussed as being a singular selectable feature, the climate control feature may include a plurality of climate control features, each being assigned their own feature probability. Thus, features such as cabin heat, cabin cooling, fan speed, fan direction, etc., may each be evaluated and promoted on their own accord.

In yet another example, the vehicle event may include a speed event. In this example, a drastic increase in speed, or achieving a vehicle speed over a certain threshold, may indicate that the vehicle is currently driving on a highway. Historically, upon reaching this speed, the specific user may increase the volume of the audio to account for the increased road noise. Accordingly, the audio controls may be promoted on the interface 105.

In another example, the vehicle event may be a mobile device event. In this example, upon receiving an incoming phone call, a user may adjust certain vehicle controls such as turning down the fan speed and audio volume. Thus, these features, which are historically selected in response to receiving a phone call, may be promoted in future like-circumstances.

Figure 6:
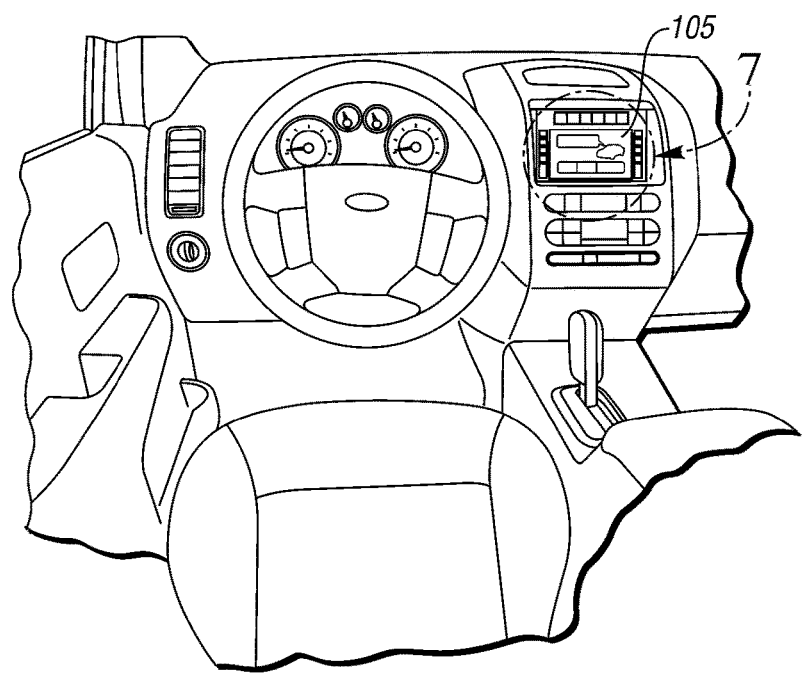
FIG. 6 illustrates an exemplary interface within a vehicle of the user interface system.
Figure 7:
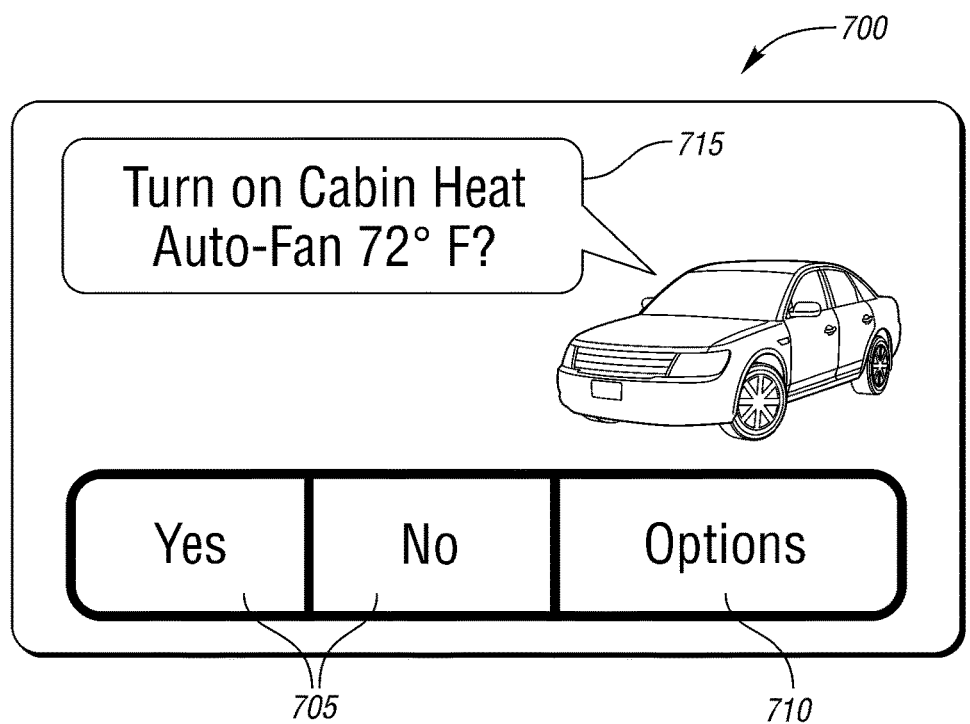
FIG. 7 illustrates an exemplary screen shot of the user interface system.

FIG. 6 illustrates an exemplary interface system within a vehicle and FIG. 7 illustrates an exemplary screen shot 700 for the interface 105. As shown, the screen shot 700 may provide an alert 715, which may include discrete option buttons 705 such as 'yes' or 'no' with respect to a specific feature. In the example shown, the screen shot may present the driver with the option to turn the cabin heat to auto-fan at 72 degrees. The user may also be presented with an option button 710, which may, upon selection, present the user with other options associated with the alert (e.g., other climate control options.)

Further, similar alerts may be displayed via the user's mobile device, as explained. In the example of a learned historical event (e.g., starting ones car at certain times on certain days), the vehicle, via an in-vehicle modem, or other outside server, may transmit a command to the user device instructing the user device to display an alert. In the example given herein, where a user routinely starts his or her car at a given time, the controller 120 may transmit the command to the user device approximately five minutes prior to the learned historical event. The alert may ask the user if he or she would like the vehicle to start in order to have the vehicle warmed up for the driver. The controller 120, in addition to taking into account the learned historical event, may also take into consideration other vehicle attributes such as the ambient temperature and a vehicle status such as whether the vehicle is current plugged in (for electric vehicles.) The alert may include discrete buttons, similar to those shown in FIG. 7, where the driver may select 'yes' or 'no'.

Accordingly, described herein is an interface system for determining, in real-time or near real-time, the likelihood that a vehicle feature will be selected by a driver based on historical selection with specific vehicle attributes and with respect to a vehicle event such as key-on is described herein. By continually evaluating the selectable features, the interface may be more user-friendly, increase the frequency of use of various features due to the displaying of the most relevant features at a time that they may likely be used.

Computing devices, such as the mixer, remote device, external server, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included with in a computing device employing a computer operating system such as one of those mentioned above, and are accessed via a network and any one or more of a variety of manners. A file system may be accessible for a computer operating system, and make the files stored in various formats. An RDBMS generally employs the Structure Query Language (SQL) in addition to language for creating, storing, editing, and executing stored procedures, such as PL/SQL language mentioned above.

In some examples, system elements may be implemented as computer-readable instructions (e.g., software) on one or more computing devices (e.g., servers, personal computers, etc.), Stored on computer readable media associated there with (e.g., disks, memories, etc.). A computer program product may comprise such instructions stored in computer readable media for carrying out the functions described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle interface system, comprising:
an interface configured to present selectable features; and
a controller programmed to
recognize a user identification;
generate a feature probability for each selectable feature based at least in part on at least one historical selection of each selectable feature at a time from vehicle key-on by a user associated with the user identification; and
display certain of the selectable features based on the generated feature probabilities.

2. The system of claim 1, wherein the feature probability is generated at least in part by comparing current vehicle attributes with stored past vehicle attributes and feature selections associated with the past vehicle attributes.

3. The system of claim 2, wherein the vehicle attributes include at least one of cabin temperature, ambient temperature, vehicle location, time of day, vehicle speed, state of charge and mobile device usage.

4. The system of claim 1, wherein the feature probability for each selectable feature is generated in real-time or near real time.

5. The system of claim 1, wherein the controller is further configured to receive current vehicle attributes from at least one vehicle module and vehicle sensor.

6. The system of claim 1, wherein the controller is further configured to prioritize the selectable features based on their associated feature probability, wherein the selectable features with the highest probabilities are displayed.

7. A vehicle interface system, comprising:
an interface configured to present selectable features; and
a controller programmed to
recognize a user identification;
receive current vehicle attributes;
compare current vehicle attributes to past vehicle attributes associated with the user identification;
generate a feature probability for each selectable feature based at least in part on a historical selection of one of the selectable features at similar past vehicle attributes, wherein the historical selection is a selection by a specific user associated with the user identification; and
display certain of the selectable features based on the generated feature probabilities.

8. The system of claim 7, wherein the vehicle attributes include a time from key-on and wherein a current time from key-on is compared with a past time from key-on.

9. The system of claim 7, wherein the vehicle attributes include a cabin temperature and wherein a current cabin temperature may trigger a display of a climate control feature in response to a historical selection of the climate control feature at a past temperature similar to the current cabin temperature.

10. The system of claim 7, wherein the vehicle attributes include at least one of ambient temperature, vehicle location, time of day, vehicle speed, state of charge and mobile device usage.

11. The system of claim 7, wherein the feature probability for each selectable feature is generated in real-time or near real time.

12. The system of claim 7, wherein the current vehicle attributes are received from at least one vehicle module and vehicle sensor.

13. The system of claim 7, wherein the controller is further programmed to prioritize the selectable features based on their associated feature probability, wherein the selectable features with the highest probabilities are displayed.

14. A vehicle interface system, comprising:
an interface configured to present selectable features; and
a controller programmed to
recognize a user identification;
generate a feature probability for each selectable feature based at least in part on a vehicle event and a historical selection of each selectable feature for a similar type event by a user associated with the user identification; and
display certain of the selectable features based on the generated feature probabilities.

15. The system of claim 14, wherein the feature probability is generated at least in part by comparing current vehicle attributes with stored past vehicle attributes and feature selections associated with the past vehicle attributes.

16. The system of claim 15, wherein the current vehicle attributes are received in near real-time from at least one of a vehicle module and vehicle sensor.

17. The system of claim 14, wherein the similar type event includes a time from vehicle start.

\* \* \* \* \*